United States Patent
Hanson et al.

(10) Patent No.: US 9,528,891 B2
(45) Date of Patent: Dec. 27, 2016

(54) SLIP RING CONTAINMENT BAND

(71) Applicant: Hamilton Sundstrand Corporation, Charlotte, NC (US)

(72) Inventors: Brian J. Hanson, Rockford, IL (US); Alan D. Hanson, Winnebago, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 14/552,511

(22) Filed: Nov. 25, 2014

(65) Prior Publication Data
US 2016/0146682 A1   May 26, 2016

(51) Int. Cl.
| | |
|---|---|
| *G01B 7/16* | (2006.01) |
| *G01L 1/00* | (2006.01) |
| *G01L 3/14* | (2006.01) |
| *H01R 39/08* | (2006.01) |
| *G01M 15/14* | (2006.01) |
| *G01M 13/02* | (2006.01) |
| *G01M 99/00* | (2011.01) |

(52) U.S. Cl.
CPC .......... *G01L 3/1492* (2013.01); *G01M 13/025* (2013.01); *G01M 15/14* (2013.01); *G01M 99/004* (2013.01); *H01R 39/08* (2013.01)

(58) Field of Classification Search
CPC ............ G01L 5/12; G01L 3/1492; G01L 3/04; H01R 39/08; G01M 15/14
USPC ..... 73/862.49, 862.474, 112.01, 773; 439/13
See application file for complete search history.

(56) References Cited

U.S. PATENT DOCUMENTS

| | | | | |
|---|---|---|---|---|
| 2,392,293 | A * | 1/1946 | Ruge | G01L 3/108 338/2 |
| 2,423,620 | A * | 7/1947 | Ruge | 374/153 |
| 2,657,295 | A * | 10/1953 | Barclay | H01C 10/06 338/132 |
| 3,074,011 | A * | 1/1963 | Hedrick | H03J 5/00 323/370 |
| 5,018,174 | A * | 5/1991 | Collins | A61B 6/56 310/166 |
| 5,952,762 | A * | 9/1999 | Larsen et al. | B60R 16/027 310/232 |
| 6,995,539 | B1 | 2/2006 | Hansson et al. | |
| 7,045,987 | B2 | 5/2006 | Niiranen | |
| 7,142,071 | B2 | 11/2006 | Coleman | |
| 8,260,019 | B2 | 9/2012 | Chandra | |
| 2006/0089009 | A1* | 4/2006 | Krumme | H01F 38/18 439/13 |

FOREIGN PATENT DOCUMENTS

JP    S5788861 A    6/1982

OTHER PUBLICATIONS

Great Britain Search Report for Great Britain Application No. 1520784.8 completed May 19, 2016, pp. 2.

* cited by examiner

*Primary Examiner* — Lisa Caputo
*Assistant Examiner* — Roger Hernandez-Prewit
(74) *Attorney, Agent, or Firm* — Carlson, Gaskey & Olds, PC

(57) ABSTRACT

A slip ring has a rotating portion configured to take in signals from rotating electric transmission elements, and communicate those signals into a static portion. The rotating portion has a plurality of resistors which rotate. The resistors have an outer peripheral surface, and a containment ring surrounding the outer peripheral surface of the plurality of resistors. A method of testing a rotating component is also disclosed.

16 Claims, 2 Drawing Sheets

SLIP RING CONTAINMENT BAND

BACKGROUND OF THE INVENTION

This application relates to a containment band for holding a plurality of resistors which are part of a slip ring in a testing system.

Many components must be tested after manufacture. Some components are subject to rotation at speeds that will approximate their rotational speed and use.

Sensors, such as strain gauges, may be mounted to sense stresses and strains in the component, such as during high speed rotation. These signals must be sent to a controller, which may be static.

A so-called slip ring is often utilized to communicate rotating electric transmission systems to a static control. One known type of slip ring includes a resistor bridge associated with a rotating part of the slip ring. This resistor bridge will rotate at high speed along with the rotating component.

SUMMARY OF THE INVENTION

A slip ring has a rotating portion configured to take in signals from rotating electric transmission elements, and communicate those signals into a static portion. The rotating portion has a plurality of resistors which rotate. The resistors have an outer peripheral surface, and a containment ring surrounding the outer peripheral surface of the plurality of resistors. A method of testing a rotating component is also disclosed.

These and other features may be best understood from the following drawings and specification.

DETAILED DESCRIPTION

Figure 1A:
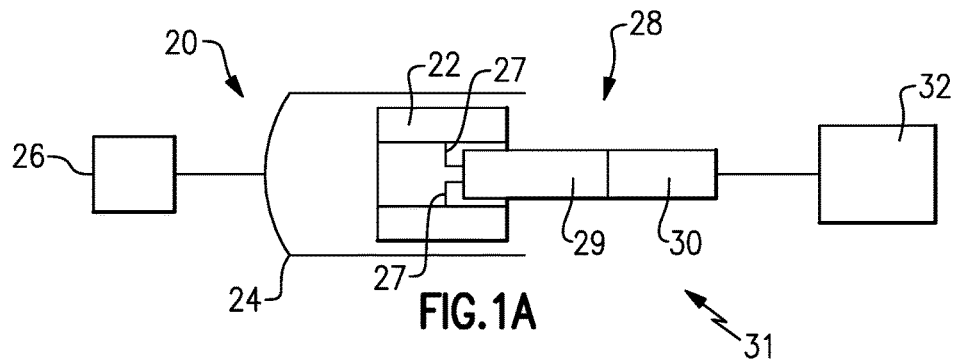
FIG. 1A is a schematic view of a testing system.

FIG. 1A shows a testing system 20. A component 22 to be tested is mounted within a driving member 24. Driving member 24 is driven to rotate by a motor 26 and, in turn, transmits rotation to the component 22. The component 22 may be a component that will expect to see high speed rotation during use.

Strain gauges 27 are associated with the component 22 and communicate to a slip ring 28. As known, a slip ring assembly 31 has a rotating portion 29 that takes signals in from rotating electric transmission members and communicates them to a static portion 30. The signals then pass to a control 32.

System 20 may operate by having motor 26 drive member 24 to drive the component 22.

Figure 1B:
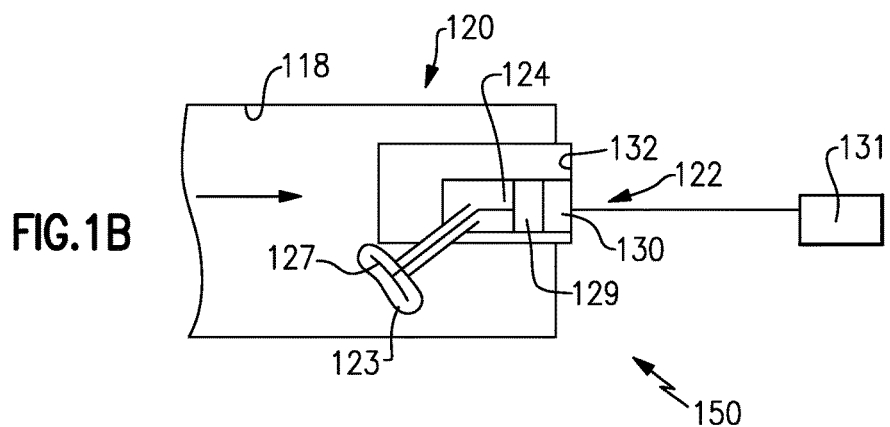
FIG. 1B is a schematic view of a ram air turbine testing system.

FIG. 1B shows another test system 120. Test system 120 may be utilized if the component 122 to be tested is a ram air turbine. As known, a ram air turbine has a propeller 123 that may be deployed from an aircraft. The propeller 123 is driven by air as the aircraft moves through the air and communicates to a generator 124 in a housing 132 to generate electricity. Such systems are known, and utilized to provide emergency electrical power for an aircraft.

As shown, the test system 120 may include a wind tunnel 118 for driving air towards the propeller 123. Gauges 127 are mounted on the propeller, and communicate to a rotating portion 129 of a slip ring assembly 150, which in turn communicates to a static portion 130 mounted on the housing 132 of the ram air turbine. Static portion 130 communicates signals to a control 131.

The system, with a wind tunnel, could also be utilized to test the ram air turbine 122 while it is actually mounted on an aircraft.

This rotation may be at very high speeds, for example on the order of 4500 rpm. Of course, other speeds would come within the scope of this disclosure. During this rotation, the gauges 27 monitor the stresses and strains within the component 22 and communicate signals through slip ring 31 and to control 32.

Figure 2:
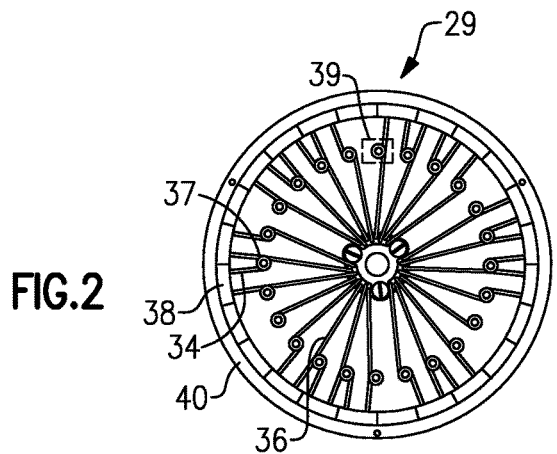
FIG. 2 shows a portion of a slip ring.

As shown in FIG. 2, rotating portion 29 (rotating portion 129 would be constructed in a similar manner) has a resistor bridge including a plurality of rectangular resistors 38 communicating through members 34 and wires 36. Members 34 extend from the resistors 38 to a turret 37. Other wires 36 communicate with the strain gauges. A brush 39 is shown in phantom, and would sit axially spaced outwardly of the plane of FIG. 2, and be a part of the slip ring static portion 30. As the turrets 37, wires 34 and 36, and resistors 38 all rotate, they move along the brushes 39 which communicate the electrical signals through brushes 39 and to control 32. This structure will rotate at high speed. Thus, the resistors 38 will see centrifugal forces urging them outwardly.

A containment ring or band 40 is formed about the resistors 38 to contain them during high speed rotation.

Figure 3:
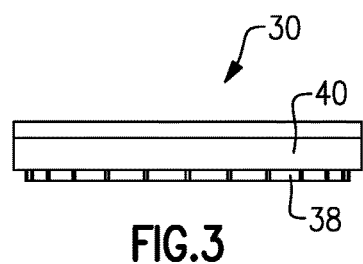
FIG. 3 is a side view of the FIG. 2 portion.

As shown in FIG. 3, containment ring 40 need not cover the entire axial length of the resistors 38.

Figure 4:
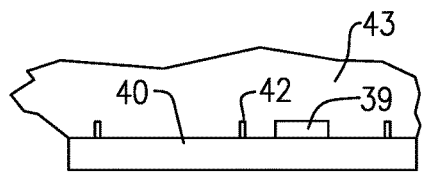
FIG. 4 is a side view.

FIG. 4 shows details of the containment ring 40 including a plurality of pins 42 for attachment to a portion 43 of the slip ring 31. Brush 39 is shown schematically. In the disclosed embodiment, there are three pins 42. Each may have a diameter of 0.050 inch (0.127 centimeter) and may extend for an axial length of 0.25 inch (0.635 centimeter). The pins are equally spaced by 120 degrees. An epoxy may also be utilized to assist in securing the band 40 to the portion 43.

Figure 5A:
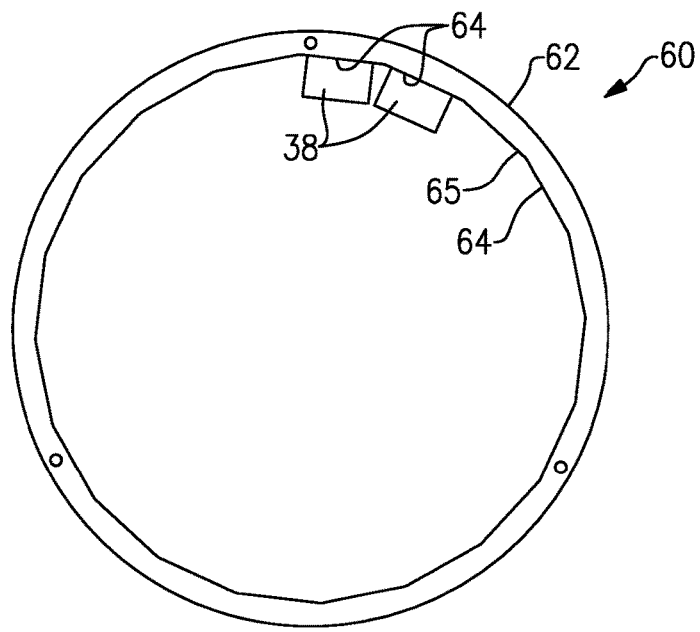
FIG. 5A shows a second embodiment.

A second embodiment 60 is illustrated in FIG. 5A. Second embodiment 60 is a ring with a generally cylindrical outer peripheral surface 62, but having a plurality of flats 64 on an inner peripheral surface. As shown, part-circular portions 65 separate the flats 64. As mentioned, resistors 38 have a flat outer surface, and the flats 64 formed on the inner periphery of containment ring 60 may serve to better position the resistors 38.

Figure 5B:
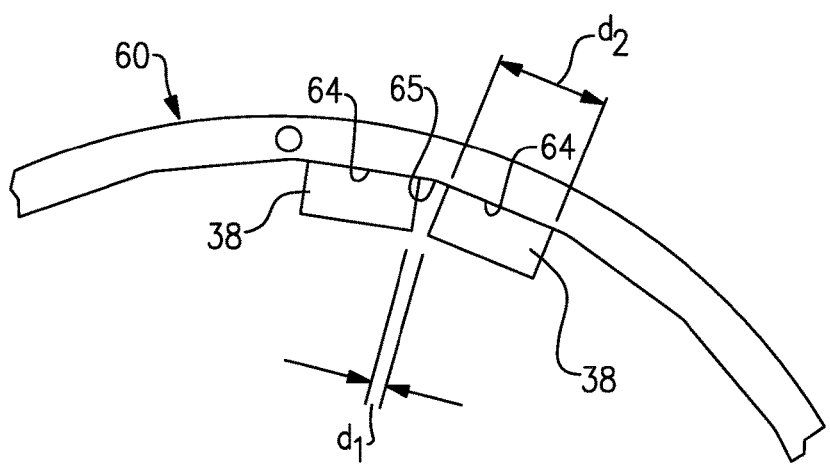
FIG. 5B is a detail of the second embodiment.

As shown in FIG. 5B, there is a distance $d_1$ over which the part-circular portions 65 extend between edges of adjacent flats 64. In one embodiment, the distance $d_1$ was 0.027 inch (0.068 centimeter). The resistors extend over a second distance $d_2$. In one embodiment, the distance $d_2$ was 0.300 inch (0.762 centimeter).

In embodiments, the resistors may bonded to the band 40 using a potting compound, such as Dolph Motor Potting Compound.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A system comprising:
   a slip ring having a rotating portion configured to take in signals from rotating electric transmission elements, and communicate those signals into a static portion;
   the rotating portion having a plurality of resistors which rotate, said resistors having an outer peripheral surface, and a containment ring surrounding said outer peripheral surface of said plurality of resistors; and
   gauges are mounted on a component which is rotating, and said gauges being said rotating electric transmission elements, and said resistors connected to wires that each extend from one of said resistors to one of a plurality of turrets, or one of a plurality of strain gauges such that said turrets communicate electrical signals through brushes to a control, and said containment ring containing said resistors during rotation of said rotating portions.

2. The system as set forth in claim 1, wherein said resistors are generally rectangular.

3. The system as set forth in claim 2, wherein said containment ring has a plurality of pins extending in an axial direction to attach the containment ring to another portion of the slip ring.

4. The system as set forth in claim 3, wherein said resistors extend for an axial distance beyond an axial distance of said containment ring.

5. The system as set forth in claim 3, wherein an inner periphery of said containment ring has flats to receive radially outer surfaces of said resistors.

6. The system as set forth in claim 5, wherein said flats are separated by part-circular portions.

7. The system as set forth in claim 1, wherein the component to be tested is a turbine.

8. The system as set forth in claim 7, wherein the turbine is a ram air turbine.

9. The system as set forth in claim 8, wherein an air source causes a portion of said ram air turbine to rotate.

10. The system as set forth in claim 1, wherein a rotational drive drives said component to rotate.

11. The system as set forth in claim 1, wherein an inner periphery of said containment ring has flats to receive radially outer surfaces of said resistors.

12. The system as set forth in claim 11, wherein said flats are separated by part-circular portions.

13. A method of testing a rotating component comprising the steps of:
   (a) rotating a component and including gauges on the rotating component, and transmitting signals from said gauges through a slip ring and to a controller to analyze those signals;
   (b) the slip ring including a plurality of resistors which are rotated, and said resistors having an outer peripheral surface, and a containment ring surrounding said outer peripheral surface of said plurality of resistors, and said resistors connected to wires that each extend from one of said resistors to one of a plurality of turrets, or one of a plurality of strain gauges such that said turrets communicate electrical signals through brushes to a control, and said containment ring containing said resistors during rotation of said rotating portions; and
   (c) said component is a turbine.

14. The method as set forth in claim 13, wherein said resistors are rectangular.

15. A system comprising:
   a slip ring having a rotating portion configured to take in signals from rotating electric transmission elements, and communicate those signals into a static portion;
   the rotating portion having a plurality of resistors which rotate, said resistors having an outer peripheral surface, and a containment ring surrounding said outer peripheral surface of said plurality of resistors; and
   said resistors being generally rectangular, and said resistors connected to wires that each extend from one of said resistors to one of a plurality of turrets, or one of a plurality of strain gauges such that said turrets communicate electrical signals through brushes to a control, and said containment ring containing said resistors during rotation of said rotating portions.

16. The system as set forth in claim 15, wherein said resistors are rectangular.

* * * * *